's
United States Patent [19]

Marsee

[11] 4,016,845

[45] Apr. 12, 1977

[54] FUEL INDUCTION SYSTEM

[75] Inventor: Frederick J. Marsee, Clawson, Mich.

[73] Assignee: Ethyl Corporation, Richmond, Va.

[22] Filed: Oct. 20, 1975

[21] Appl. No.: 624,730

Related U.S. Application Data

[63] Continuation-in-part of Ser. No. 498,951, Aug. 20, 1974, and Ser. No. 508,087, Sept. 23, 1974, Pat. No. 3,972,324, and Ser. No. 498,960, Aug. 20, 1974, Pat. No. 3,971,352, which is a continuation-in-part of Ser. No. 439,912, Feb. 6, 1974, abandoned.

[52] U.S. Cl. .................. 123/122 AC; 123/122 AB; 123/141; 261/145; 261/DIG. 55; 261/21

[51] Int. Cl.² ...................................... F02M 31/00

[58] Field of Search ........ 123/122 AC, 122 A, 133, 123/127, 52 MV, 122 AB, 141; 261/144, 145, 142, DIG. 55, DIG. 21, DIG. 23 A

[56] References Cited

UNITED STATES PATENTS

| 1,431,327 | 10/1922 | Perry | 123/122 AC |
|---|---|---|---|
| 1,479,381 | 1/1924 | Good | 123/122 AC |
| 1,676,955 | 7/1928 | Kemp | 123/122 AC |
| 1,854,298 | 4/1932 | Godward | 123/122 A |
| 3,847,125 | 11/1974 | Malherbe | 123/141 |
| 3,850,153 | 11/1974 | Sigwald | 123/122 AB |
| 3,942,500 | 3/1976 | Koehm | 123/141 |

FOREIGN PATENTS OR APPLICATIONS

| 958,439 | 2/1957 | Germany | 261/DIG. 55 |

Primary Examiner—Ronald H. Lazarus
Attorney, Agent, or Firm—Donald L. Johnson; Robert A. Linn; Joseph D. Odenweller

[57] ABSTRACT

An internal combustion engine having a carburetor-type fuel induction system in which the primary carburetor barrel delivers an air/fuel mixture into a container. The air/fuel mixture is conducted from the container into the intake manifold. A liquid trap is provided between the primary barrel and the container to collect liquid gasoline running down the side wall. This trapped liquid is delivered directly to the intake manifold, resulting in improved cold start performance of the engine. The container is preferably heated by means such as exhaust gas, liquid engine coolant or electrical heaters.

9 Claims, 4 Drawing Figures

FUEL INDUCTION SYSTEM

This application is a continuation-in-part of applications Ser. No. 498,951, filed Aug. 20, 1974, Ser. No. 508,087, filed Sept. 23, 1974, now U.S. Pat. No. 3,972,324, and Ser. No. 498,960, filed Aug. 20, 1974, now U.S. Pat. No. 3,971,352, which in turn is a continuation-in-part of application Ser. No. 439,912, filed Feb. 6, 1974, now abandoned.

BACKGROUND

Of recent years there has been a trend toward operating spark-ignited internal combustion engines at leaner air/fuel ratios in order to decrease the amount of hydrocarbon and carbon monoxide in the exhaust. One limiting factor in going towards leaner operation is gasoline maldistribution from cylinder-to-cylinder. The inducted air/fuel ratio must be kept lean enough such that the cylinder supplied with the leanest mixture will still fire, otherwise exhaust hydrocarbon and carbon monoxide emission will increase rather than decrease.

Several methods have been proposed to minimize the problem. According to one method the entire intake manifold on which is mounted the primary venturi carburetor is heated by providing an exhaust gas jacket around the intake manifold (Bartholomew, "Potentialities of Emission Reduction by Design of Induction Systems," S.A.E. Meeting January 1966, Detroit, Michigan). According to another method, a "hot spot" is provided in the intake manifold directly below the primary venturi. This is accomplished by having a thin sheet metal plate separate the exhaust cross-over from the intake manifold at this location (W. D. Bond, "Quick-Heat Intake Manifolds for Reducing Cold Engine Emissions," S.A.E. Meeting October 1972, Tulsa, Oklahoma). Both of these methods are effective but do not eliminate the problem.

Other related induction systems resulting from a prior art search and listed in chronological order are:

Kambak, U.S. Pat. No. 1,479,547 (1924) which discloses an induction system in which liquid fuel is delivered into a bulbous chamber located in the exhaust manifold. The liquid fuel is vaporized and then mixed with air which is inducted through separate means.

Maroger, Fr. Pat. No. 629,582 (1926) which discloses an exhaust-jacketed heat exchanger placed between the carburetor and the engine intake.

Mock, U.S. Pat. No. 1,777,472 (1930) which employs a thin wall hot spot in the carburetor adjacent to the power jet to assist in vaporization of excess gasoline inducted during acceleration.

Duthoit, U.S. Pat. No. 2,066,720 (1937) which discloses an updraft carburetor in which the air/fuel mixture is conducted through a bulbous conduit which extends transversely through the exhaust manifold.

Titus, U.S. Pat. No. 2,720,197 (1955) which discloses a liquid-heated heat exchanger installed between the carburetor and the intake manifold.

Summers, U.S. Pat. No. 3,016,051 (1962) disclosing a two-barrel induction system for a V-type engine which includes a U-tube which connects the two separate branches of the intake manifold. The U-tube extends into the exhaust cross-over.

Other publications in this area are Sigwald, U.S. Pat. No. 3,850,153; Godward, U.S. Pat. No. 1,854,298; Norris, U.S. Pat. No. 3,809,032; Burch, U.S. Pat. No. 3,037,493; Durr, U.S. Pat. No. 890,970; Good, U.S. Pat. No. 1,479,381; Kemp, U.S. Pat. No. 1,663,634; Good, U.S. Pat. No. 1,458,481; Holley, U.S. Pat. No. 2,745,394; Summers, U.S. Pat. No. 3,016,051; Mock, U.S. Pat. No. 1,777,472; Ader, U.S. Pat. No. 3,827,416; and Buchwald, U.S. Pat. No. 3,814,071.

SUMMARY OF THE INVENTION

In my previous applications, Ser. No. 498,960, filed Aug. 20, 1974, now U.S. Pat. No. 3,971,252, Ser. No. 498,951, filed Aug. 20, 1974, and Ser. No. 508,087, filed Sept. 23, 1974, now U.S. Pat. No. 3,972,324, I described an improved fuel induction system in which fuel maldistribution problems in a multicylinder engine can be substantially lessened by providing a container in the exhaust flow path. The carburetor barrel, or venturi, delivers an air/fuel mixture directly into this container in which it is heated and subjected to great turbulence forming a uniform air/fuel mixture. This uniform air/fuel mixture is then conducted into the intake manifold and thence into the individual cylinders.

Significant reductions in exhaust hydrocarbon and carbon monoxide are obtained using the above-described turbulent flow system. According to the present invention, still further improvement in overall performance is achieved by installing a liquid trap on the inside wall of the conduit leading from the primary carburetor barrel, or barrels, into the container. During cold start of the engine liquid gasoline tends to impinge on the inside surface of the carburetor barrel and drain down into the container, which impedes engine start. The trap provided by the present invention collects this liquid gasoline before it reaches the container and conducts it directly into the intake manifold, thus allowing this small amount of liquid to by-pass the container. After start-up, substantially all of the air/fuel mixture still passes into the turbulent mixing container prior to entering the intake manifold.

DESCRIPTION OF THE PREFERRED EMBODIMENTS

A preferred embodiment of this invention is a spark-ignited multicylinder internal combustion engine having improved cylinder-to-cylinder fuel distribution and cold starting ability, said engine comprising means for atomizing gasoline into a carburetor barrel, intake passage means for delivering air/fuel mixture to each of said multicylinders, an enclosed container having an inlet and an outlet, first passage means connecting said carburetor barrel to said inlet, second passage means connecting said outlet to said intake passage means, liquid fuel trap means inside said first passage means adapted to trap liquid fuel running down the inside wall of said first passage means, said first passage means having at least one small opening in said inside wall, said small opening forming a passage from said trap means into said intake passage means whereby liquid fuel passes directly from said trap means into said intake passage means by-passing said container. Preferably, means are provided to heat the container.

Figure 1:
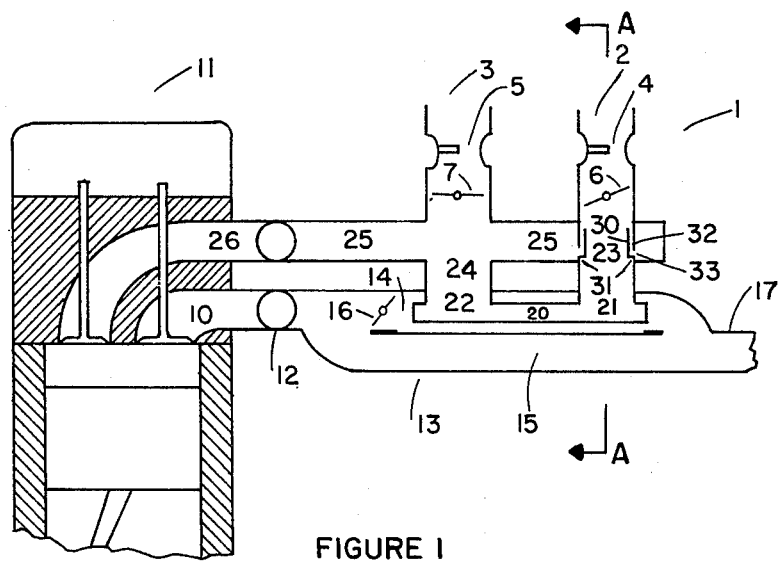
FIG. 1 is a schematic cross-section of the invention installed in an in-line engine.
Figure 2:
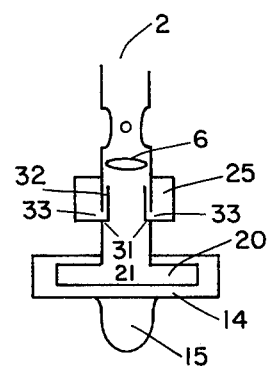
FIG. 2 is a cross-section taken at AA of FIG. 1.

Referring to the embodiment shown in FIG. 1, the system comprises carburetor 1 having a primary barrel 2 and secondary barrel 3. Air/fuel mixtures are formed in the carburetor by primary venturi 4 and secondary venturi 5. Throttle valve 6 controls the volume of air/fuel mixture flowing through the primary barrel, and secondary throttle valve 7 controls the volume of air/fuel mixture flowing through the secondary barrel.

Exhaust gas leaving exhaust port 10 of engine 11 flows through exhaust manifold 12 into unit 13 having a main exhaust passage 14 and a by-pass exhaust passage 15. Valve 16 controls the flow of hot engine exhaust. Exhaust leaves unit 13 through exhaust pipe 17.

Located inside exhaust passage 14 is container 20 which has inlet 21 and outlet 22. First conduit 23 connects primary barrel 2 to inlet 21. Secondary conduit 24 connects outlet 22 to intake manifold 25 which forms a passage to the intake port 26 of each cylinder.

Located inside first conduit 23 is tubular member 30 which is spaced apart (appx. 2 to 5 mm) from the inside wall of first conduit 23 and is sealably engaged to the inside wall by bottom closure ring 31 forming an annular reservoir 32 between tubular member 30 and the inside wall of first conduit 23.

Located around the circumference of first conduit 23 are a series of small openings 33 (appx. 3 to 8 mm dia. or 2 × 6 mm slots) proximate to the bottom of reservoir 32 which form a passage into intake manifold 25.

In operation, starting with a cold engine, cranking the engine initially causes liquid gasoline to run into primary barrel 2 at about a 1:1 air/fuel ratio. Much of this initial gasoline is deflected by throttle valve 6 against the side wall of the primary barrel. This liquid flows down the inside wall of first conduit 23 and into reservoir 32. From here, it is inducted directly into intake manifold 25 through openings 33 and thence to the intake port of each cylinder, allowing the engine to start rapidly under cold operating conditions.

Once the engine starts, the volume of air inducted through primary barrel 2 increases sharply causing better atomization and increased velocity and turbulence of air/fuel mixture flowing through the primary barrel and consequently very little of the atomized gasoline forms a liquid film on the inside wall of first conduit 23. Under these operating conditions substantially all of the air/fuel mixture now passes through first conduit 23 and inlet 21 into container 20 wherein extreme turbulence forms a uniform air/fuel mixture. This resultant air/fuel mixture flows through outlet 22 and second conduit 24 into intake manifold 25 and thence to the intake port 26 of each of the multicylinders.

Another factor contributing to the uniformity of the air/fuel mixture formed in container 20 is the length of first conduit 23. This conduit has a length of about 2 to 5 times its diameter, which provides a longer than normal flow path for the primary air/fuel mixture and affords more opportunity for the mixture to form a uniform mixture than in a conventional induction system.

Under high load, secondary throttle valve 7 opens inducting a secondary air/fuel mixture through secondary barrel 3 directly into intake manifold 25 at a location about opposite the location at which secondary conduit 24 opens into intake manifold 25. This feature is quite important because any air leaking past valve 7 during idle or low load operation is uniformly mixed with all of the primary air/fuel mixture prior to being distributed to each of the multicylinders, thus providing a uniform air/fuel ratio during idle and low load operating conditions.

Figure 3:
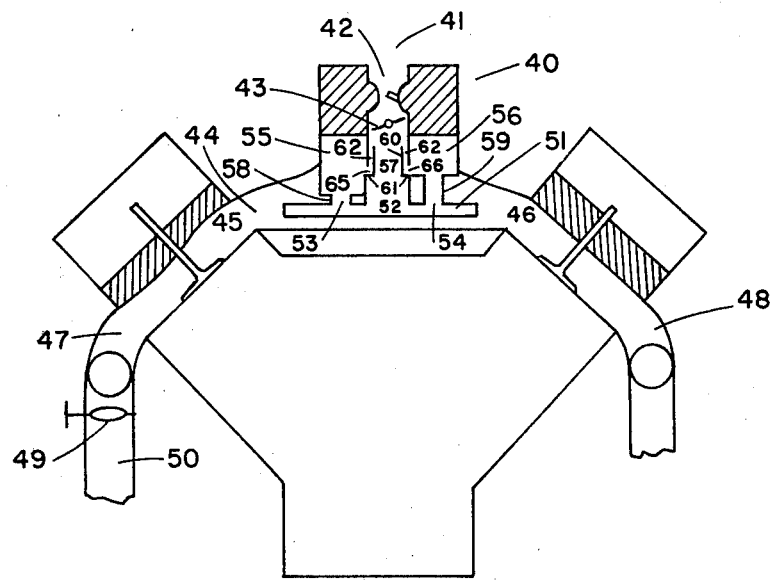
FIG. 3 is a schematic cross-section of the invention installed in a V-type engine.

FIG. 3 shows the improved induction system installed in a V-type engine. Carburetor 40 has a primary barrel 41 including venturi 42 and throttle valve 43. Exhaust cross-over 44 connects an exhaust port 45 on one bank of cylinders with an exhaust port 46 on the other bank of cylinders. The one bank of cylinders exhausts through exhaust manifold 47. The other bank of cylinders exhausts through exhaust manifold 48. Exhaust control valve 49 controls the relative proportion of exhaust flow through exhaust pipe 50 and exhaust cross-over 44.

Mounted within exhaust cross-over 44 is container 51 having inlet 52 and outlets 53 and 54. The intake manifold is comprised of intake runners 55 and 56. Runner 55 supplies air/fuel mixture to one-half of the multicylinders and runner 56 supplies the other half of the multicylinders in a conventional manner.

First conduit 57 forms an elongated passage from primary barrel 42 into container 51. Secondary conduit 58 forms a passage from the outlet 53 of container 51 into runner 55. Secondary conduit 59 forms a passage from the outlet 54 of container 51 into runner 56.

Located inside first conduit 57 is a liquid trap formed by concentric tubular member 60 spaced a small distance (appx. 2 to 5 mm) from the inside wall of conduit 57. The bottom of member 60 is sealed to the inside wall of first conduit 57 by bottom closure ring 61 forming annular reservoir 62. A series of small openings (appx. 3 to 8 mm dia. or 2 × 6 mm slots) in the side wall of first conduit 57 at the bottom of reservoir 62 form a passage to runner 55 (openings 65) and with runner 56 (openings 66).

In operation, starting with a cold engine, cranking the engine inducts air and liquid gasoline into primary barrel 41. Throttle valve 43 deflects much of the gasoline against the side wall of primary barrel 41 and first conduit 57. The liquid gasoline runs down the inside wall of first conduit 57 into reservoir 62 and is inducted directly into intake runners 55 and 56 through openings 65 and 66 causing rapid firing of the engine.

Once the engine starts, the volume of air inducted through primary barrel 41 increases sharply forming a large volume of primary air/fuel mixture which is now inducted directly through first conduit 57 and inlet 52 into container 51. The primary air/fuel mixture encounters extreme turbulence in passing through first conduit 57 and container 51 forming a uniform primary air/fuel mixture.

Part of this mixture passes through outlet 53 and second conduit 58 into intake runners 55. Another part of this uniform mixture passes through outlet 54 and secondary conduit 59 into intake runner 56. Intake runners 55 and 56 then supply the multicylinders with a uniform primary air/fuel mixture.

While the engine is cold, exhaust control valve 49 is closed forcing exhaust from the left bank of cylinders to flow through exhaust cross-over 44 to be exhausted through exhaust manifold 48. This provides heat to the surface of container 51 which further improves engine performance. Once the engine attains operating temperature exhaust control valve 49 opens allowing exhaust from the left cylinder bank to exit through exhaust pipe 50.

Figure 4:
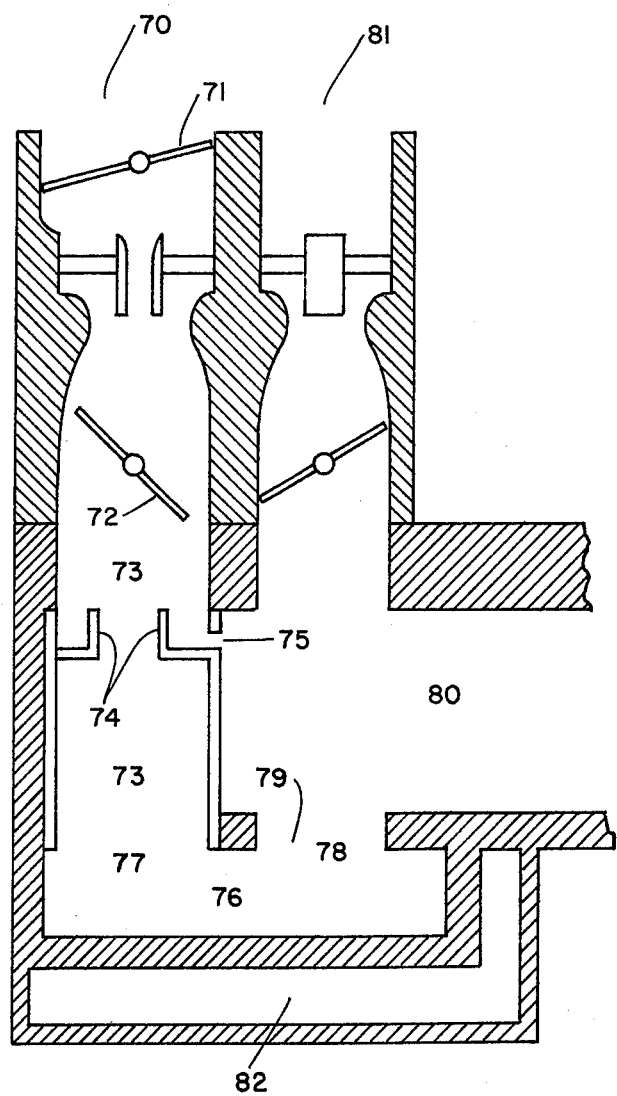
FIG. 4 is a cross-section of an induction system of this invention using liquid engine coolant to heat the container.

FIG. 4 shows the turbulent flow system using liquid engine coolant to heat the container. It includes primary barrel 70, choke valve 71, throttle valve 72, first conduit 73, liquid trap 74, opening 75 in the side wall of first conduit 73, container 76 having inlet 77 and outlet 78, second conduit 79, and intake manifold 80. Secondary barrel 81 connects to intake manifold 80 at a location opposite the place where secondary conduit 79 connects. Jacket 82 surrounds part of container 76 and is connected to the liquid cooling system of the engine (not shown) such that hot liquid coolant circulates through jacket 82.

Operation is the same as in the previously-described embodiments. During the cranking period liquid gasoline runs down the side of first passage 73 and collects in the reservoir of liquid trap 74. From here, it is inducted directly into intake manifold 80 through openings 75. After the engine starts, the atomized primary air/fuel mixture passes through container 76 and then into the intake manifold 80.

Improved engine operation is achieved even without heating the container. Preferably, the container is heated. Hot exhaust gas and liquid engine coolant have been shown. Other equivalent heating means can be used, such as electrical resistance heaters.

The liquid trap in the first conduit can be any structure that will trap liquid gasoline running down the side wall of the first conduit to prevent it from running into the container. Any barrier extending inwardly from the side wall and having liquid retention means can be used. For example, any inwardly extending flange around the circumference of the first conduit will work as long as the inner diameter of the flange has a raised barrier or is higher than the outer diameter of the flange.

Engines fitted with the turbulent flow system as described herein when properly adjusted attain hydrocarbon and carbon monoxide exhaust levels which satisfy the 1975 49 state Federal standards while operating on a commercial leaded gasoline.

I claim:

1. A spark-ignited multicylinder internal combustion engine having improved cylinder-to-cylinder fuel distribution and cold starting ability, said engine comprising means for atomizing gasoline into a carburetor barrel, intake passage means for delivering air/fuel mixture to each of said multi-cylinders, an enclosed container having an inlet and an outlet, first passage means connecting said carburetor barrel to said inlet, second passage means connecting said outlet to said intake passage means, liquid fuel trap means inside said first passage means adapted to trap liquid fuel running down the inside wall of said first passage means, said first passage means having at least one small opening in said inside wall, said small opening forming a passage from said trap means into said intake passage means whereby liquid fuel passes directly, without passing through heating means, from said trap means into said intake passage means by-passing said container.

2. An engine of claim 1 further characterized by including means for heating said container.

3. An engine of claim 2 wherein said heating means comprises a jacket around said container and means for circulating hot liquid engine coolant through said jacket.

4. An engine of claim 2 wherein said heating means comprises an exhaust passage means, said container being in heat exchange contact with exhaust gas passing through said exhaust passage.

5. An engine of claim 2 wherein said trap means comprises a wall inside said first passage means spaced apart from said inside wall of said first passage means, said wall and said side wall forming a reservoir which is open at the top to receive and trap liquid fuel running down said inside wall and closed at the bottom to prevent liquid fuel from draining into said container, said small opening in said inside wall being located proximate to the bottom of said reservoir.

6. An engine of claim 3 wherein said trap means comprises a wall inside said first passage means spaced apart from said inside wall of said first passage means, said wall and said side wall forming a reservoir which is open at the top to receive and trap liquid fuel running down said inside wall and closed at the bottom to prevent liquid fuel from draining into said container, said small opening in said inside wall being located proximate to the bottom of said reservoir.

7. An engine of claim 4 wherein said trap means comprises a wall inside said first passage means spaced apart from said inside wall of said first passage means, said wall and said side wall forming a reservoir which is open at the top to receive and trap liquid fuel running down said inside wall and closed at the bottom to prevent liquid fuel from draining into said container, said small opening in said inside wall being located proximate to the bottom of said reservoir.

8. An engine of claim 7 wherein said reservoir is formed by a cylindrical wall concentric with said first passage means and spaced apart from said inside wall and a bottom closure between said cylindrical wall and said inside wall forming an annular reservoir.

9. An engine of claim 8 having a plurality of said small openings in said inside wall proximate to the bottom of said reservoir.

* * * * *